United States Patent
Vollbracht et al.

(10) Patent No.: US 12,405,353 B2
(45) Date of Patent: Sep. 2, 2025

(54) RADAR DEVICE

(71) Applicant: Aptiv Technologies AG, Schaffhausen (CH)

(72) Inventors: Dennis Vollbracht, Hilden (DE); Alexander Ioffe, Bonn (DE); James F. Searcy, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 277 days.

(21) Appl. No.: 18/156,149

(22) Filed: Jan. 18, 2023

(65) Prior Publication Data

US 2023/0236288 A1 Jul. 27, 2023

(30) Foreign Application Priority Data

Jan. 26, 2022 (EP) .................................... 22153486

(51) Int. Cl.
*G01S 7/35* (2006.01)
*G01S 13/46* (2006.01)
(Continued)

(52) U.S. Cl.
CPC .............. *G01S 7/352* (2013.01); *G01S 13/46* (2013.01); *G01S 13/931* (2013.01); *G01S 2013/468* (2013.01); *G01S 13/584* (2013.01)

(58) Field of Classification Search
CPC ........ G01S 7/352; G01S 13/46; G01S 13/931; G01S 13/584; G01S 2013/468
(Continued)

(56) References Cited

U.S. PATENT DOCUMENTS 7,295,154 B2 * 11/2007 Walton ................ H01Q 1/3233
342/126
7,551,123 B2 * 6/2009 Stagliano, Jr. .......... G01S 13/95
342/175
(Continued)

FOREIGN PATENT DOCUMENTS

EP 0583418 B1 * 8/2002 ............. G01S 13/53
EP 4001953 A1 * 5/2022 ........... G01S 13/931
(Continued)

OTHER PUBLICATIONS

"Extended European Search Report", EP Application No. 22153486. 0, Jul. 22, 2022, 11 pages.

*Primary Examiner* — Nuzhat Pervin
(74) *Attorney, Agent, or Firm* — Harness, Dickey & Pierce, P.L.C.

(57) ABSTRACT

The present disclosure relates to apparatuses and methods for a radar device. For example, an antenna device has a first set of antennas to establish first propagation channels and a second set of antennas to establish second propagation channels. A signal processing device determines a first differential phase shift among first radar signals propagating via the first propagation channels and a second differential phase shift among second radar signals propagating via the second propagation channels. Antennas of the first set are located at positions that generate the first differential phase shift for a first multitude of target angles, and antennas of the second set are located at positions that generate the second differential phase shift for a second multitude of target angles. The processing device determines an angular position of a target object as a unique target angle that is part of the first and second multitude of target angles.

14 Claims, 7 Drawing Sheets

(51) Int. Cl.
*G01S 13/58* (2006.01)
*G01S 13/931* (2020.01)

(58) Field of Classification Search
USPC .......................................................... 342/70
See application file for complete search history.

(56) References Cited

U.S. PATENT DOCUMENTS

| | | | | |
|---|---|---|---|---|
| 8,466,829 B1* | 6/2013 | Volman | ............. | G01S 3/48 |
| | | | | 342/149 |
| 8,994,581 B1* | 3/2015 | Brown | ............. | G01S 13/931 |
| | | | | 342/149 |
| 9,966,989 B2* | 5/2018 | Bergamo | ............. | H04B 7/086 |
| 10,205,218 B2* | 2/2019 | Charvat | ............. | H01Q 9/0428 |
| 10,928,498 B1* | 2/2021 | Li | ............. | H04W 64/00 |
| 10,989,802 B2* | 4/2021 | Pos | ............. | G01S 13/882 |
| 11,018,705 B1* | 5/2021 | Holder | ............. | H04B 1/0483 |
| 11,131,749 B2* | 9/2021 | Loesch | ............. | G01S 13/931 |
| 11,391,814 B2* | 7/2022 | Cohen | ............. | G01S 7/295 |
| 11,454,700 B1* | 9/2022 | DeSalvo | ............. | G01S 7/4021 |
| 11,460,569 B2* | 10/2022 | Campbell | ............. | G01S 13/325 |
| 11,802,958 B2* | 10/2023 | Levitan | ............. | G01S 13/42 |
| 11,852,717 B2* | 12/2023 | Cattle | ............. | G01S 13/426 |
| 2011/0080267 A1* | 4/2011 | Clare | ............. | G06K 7/0008 |
| | | | | 340/10.4 |
| 2013/0335260 A1* | 12/2013 | Kuehnle | ............. | G01S 13/931 |
| | | | | 342/70 |
| 2015/0301167 A1* | 10/2015 | Sentelle | ............. | A61B 5/0205 |
| | | | | 342/22 |
| 2016/0097847 A1* | 4/2016 | Loesch | ............. | G01S 13/931 |
| | | | | 342/156 |
| 2016/0363651 A1* | 12/2016 | Lim | ............. | G01S 7/414 |
| 2018/0267140 A1* | 9/2018 | Corcos | ............. | G01S 13/34 |
| 2019/0178983 A1* | 6/2019 | Lin | ............. | G01S 13/003 |
| 2019/0324133 A1* | 10/2019 | Hong | ............. | G01S 13/003 |
| 2019/0377087 A1* | 12/2019 | Shtrom | ............. | G05D 1/0088 |
| 2020/0251832 A1* | 8/2020 | Kishigami | ............. | H01Q 21/08 |
| 2020/0256973 A1* | 8/2020 | Kim | ............. | G01S 13/931 |
| 2020/0333432 A1* | 10/2020 | Kim | ............. | H01Q 21/06 |
| 2021/0048522 A1* | 2/2021 | Pos | ............. | G01S 13/882 |
| 2021/0239822 A1 | 8/2021 | Volbracht et al. | | |
| 2021/0373144 A1* | 12/2021 | Amani | ............. | G01S 13/34 |
| 2022/0021419 A1* | 1/2022 | Zaidi | ............. | G01S 13/4454 |
| 2022/0334239 A1* | 10/2022 | Kim | ............. | G01S 13/42 |
| 2023/0038738 A1* | 2/2023 | Breddermann | ...... | G01S 13/4454 |
| 2023/0103471 A1* | 4/2023 | Jansen | ............. | G01S 13/36 |
| | | | | 342/189 |
| 2023/0208420 A1* | 6/2023 | Lohbihler | ............. | G01S 13/10 |
| | | | | 324/171 |
| 2023/0333243 A1* | 10/2023 | Cattle | ............. | G01S 13/426 |
| 2024/0291167 A1* | 8/2024 | Kishigami | ............. | G01S 13/42 |

FOREIGN PATENT DOCUMENTS

| | | | | | |
|---|---|---|---|---|---|
| EP | 4092446 | A1 * | 11/2022 | ............. | G01S 13/58 |
| EP | 4148454 | A1 * | 3/2023 | ............. | G01S 7/4086 |
| EP | 4400860 | A1 * | 7/2024 | ............. | G01S 13/426 |
| EP | 3572838 | B1 * | 8/2024 | ............. | H01Q 21/06 |
| GB | 2512497 | A * | 10/2014 | ............. | G01S 5/06 |
| JP | 6755121 | B2 * | 9/2020 | ............. | G01S 13/325 |
| WO | WO-2019209752 | A2 * | 10/2019 | ............. | H01Q 13/206 |

\* cited by examiner

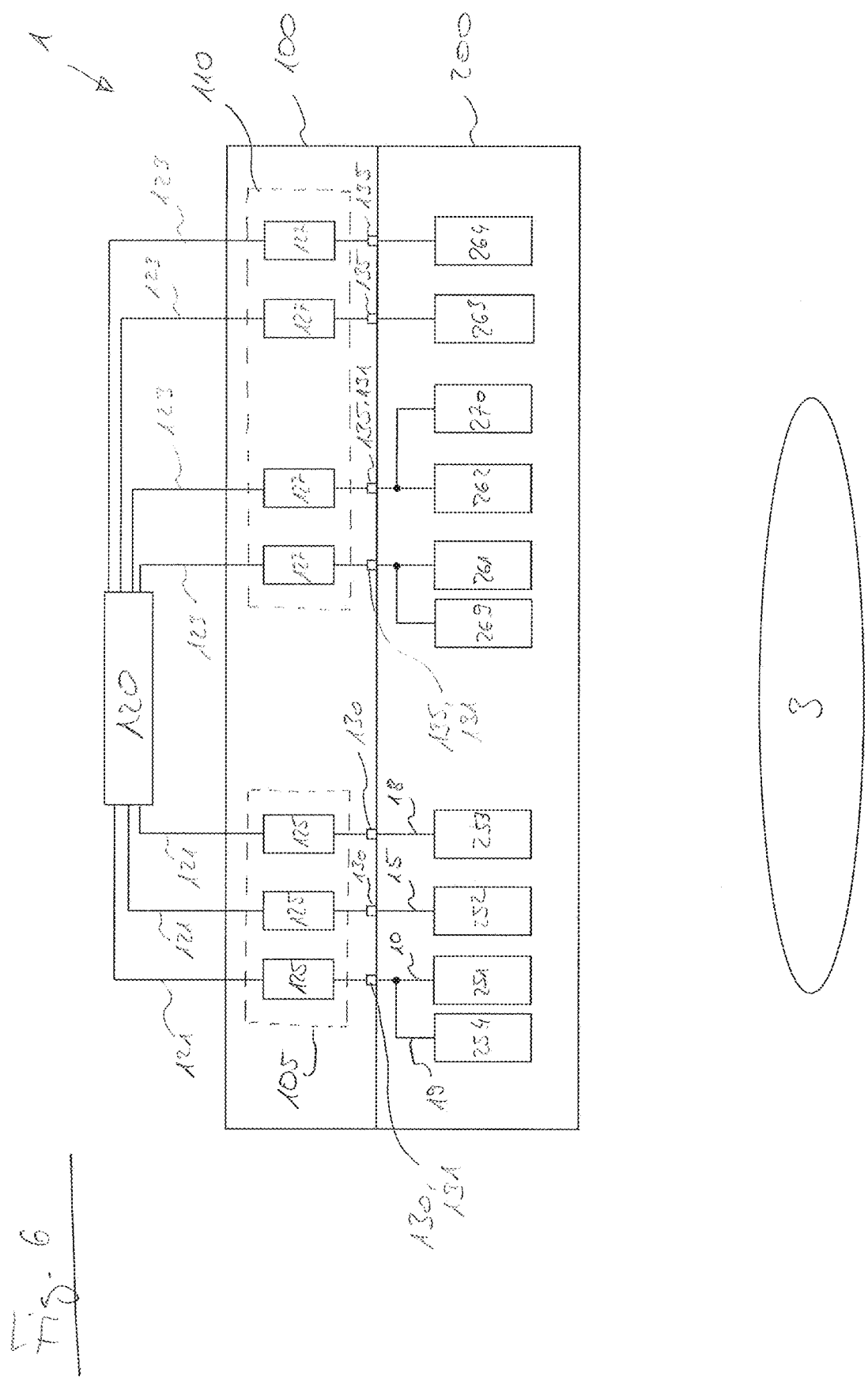

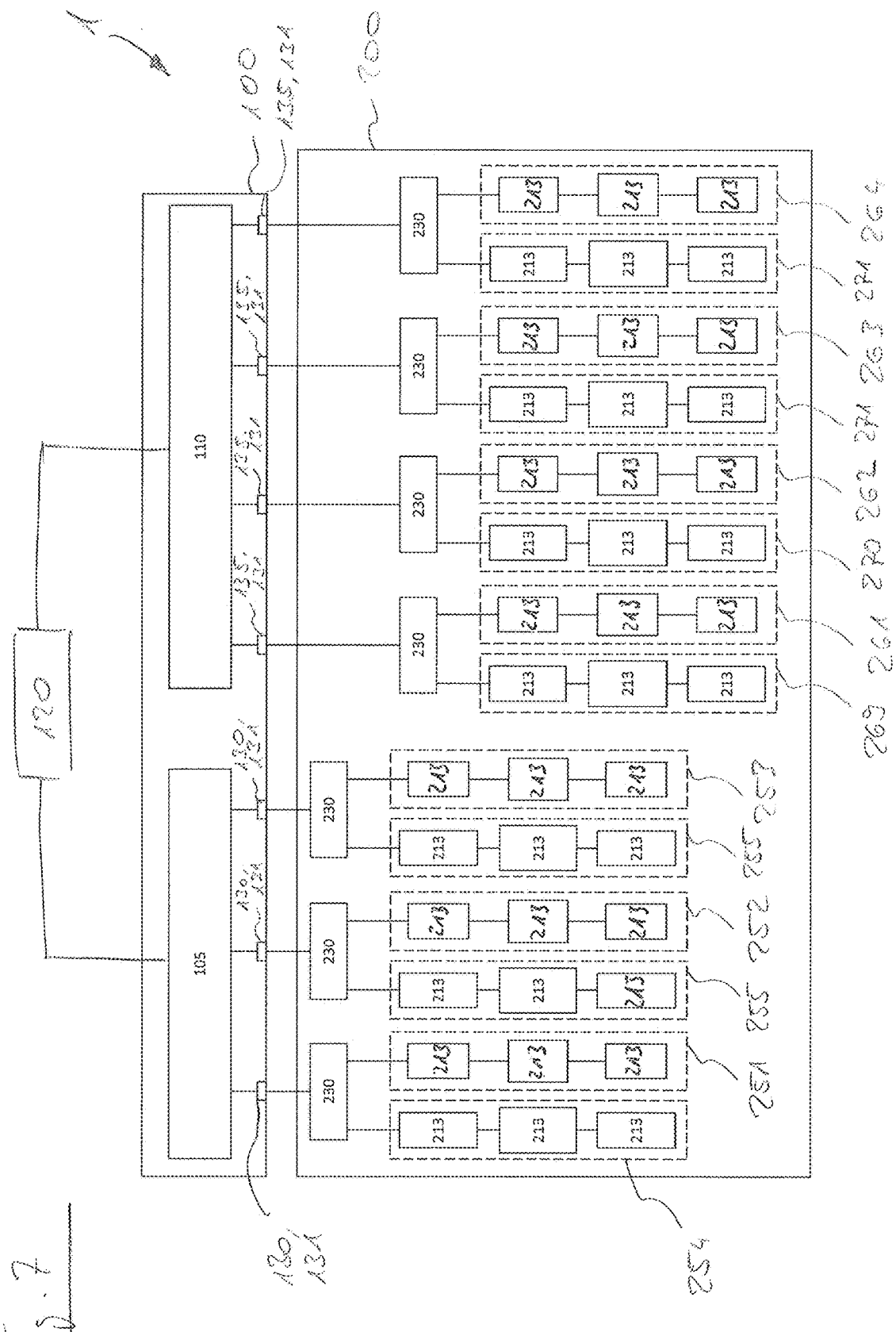

RADAR DEVICE

INCORPORATION BY REFERENCE

This application claims priority to European Patent Application Number EP22153486.0, filed Jan. 26, 2022, the disclosure of which is incorporated by reference in its entirety.

BACKGROUND

Radar devices are used in automotive applications to detect and locate target objects such as other vehicles, obstacles or lane boundaries. They may be placed at the front, at the rear or at the sides of a vehicle. Such radar devices usually comprise a signal generator to generate a radar signal, an antenna device for illuminating the target objects with the radar signal and for capturing the radar signal reflected back from the target objects and a signal receiver to analyze the radar signal reflected back from the target objects. The information extracted from the reflected radar signal may then be used for advanced driver's assist system (ADAS) functions, such as emergency brake assist, adaptive cruise control, lane change assist or the like.

SUMMARY

One information that may be extracted from the reflected radar signal may be the angular position of a target object irradiated by the radar device. For implementing ADAS functions, it is desirable to reliably detect and separate different objects positioned within the field of view of the radar device. Such separation may be realized, inter alia, using the information on angular positions provided by the radar device. Increasing the resolution of angle determination thus contributes to improve the detection efficiency of the radar device.

Angular resolution of typical radar devices is proportional to the aperture size of their antenna device, wherein the aperture size is given by the maximum distance between individual antennas used for angle determination. The larger this distance, the larger is the resolution.

However, with typical radar devices, the distance between individual antennas has to be limited to allow for unambiguous angle finding. This is because the angular position of the target object is determined from phase shifts between radar signals that are received by neighboring antennas. Thereby, the phase shift caused by a given target angle increases with increasing distance between the antennas. Since the phase shift exhibits a periodicity of 360°, an increase in the distance between individual antennas eventually leads to ambiguities as a single phase shift is attributable to a multiple of target angles.

Another possibility to increase the angular resolution of typical radar devices would be to increase the number of antennas used for angle determination, while keeping their mutual distances constant. However, since radar circuits used within these radar devices typically have a limited number of signal ports, said radar devices can only employ a limited number of antennas, which in turn limits the achievable angular resolution.

Accordingly, there is a need to provide a radar device that allows for high angular resolution with only a limited number of antennas.

The present disclosure relates to methods for operating apparatuses and to apparatuses such as a radar device, for example one for automotive applications, a vehicle equipped with such a radar device, and a method for operating a radar device. The present disclosure provides, for example, radar devices, vehicles with at least one radar device, and methods, including those described in the independent claims. Embodiments are given in the claims, the description, and the drawings.

In one aspect, the present disclosure is directed at a radar device, for example for automotive applications, comprising an antenna device and a signal processing device, wherein the radar device is configured to detect a target object via a multitude of propagation channels. The antenna device comprises a first set of antennas to establish first propagation channels and a second set of antennas to establish second propagation channels. The signal processing device is configured to determine a first differential phase shift among first radar signals propagating via the first propagation channels and to determine a second differential phase shift among second radar signals propagating via the second propagation channels. Thereby, the antennas of the first set are located at positions that generate the first differential phase shift for a first multitude of target angles, and the antennas of the second set are located at positions that generate the second differential phase shift for a second multitude of target angles. The signal processing device is configured to determine the angular position of the target object as a unique target angle that is part of both the first multitude of target angles and the second multitude of target angles.

The present disclosure is based on the idea to determine a unique target angle of an irradiated object by combining the results from two angle measurements that themselves do not provide a unique target angle of the irradiated object. This allows to use sets of antennas as the first and/or second set that have large distances between the individual antennas and therefore provide a large aperture but only ambiguous angle information. This ambiguous angle information may then be resolved by comparing the target angles of the first multitude with the target angles of the second multitude and by determining the unique target angle that is part of both the first and second multitudes. With the radar device according to the present disclosure it is thus possible to provide both a large aperture and unambiguous angle finding with only a limited number of antennas.

Furthermore, by placing the individual antennas of the antenna device at large distances from each other, mutual coupling between the antennas is kept low. This improves, inter alia, the signal-to-noise ratio of the radar signals received via the individual antennas.

The radar device may be configured to detect the target object by irradiating the target object with the radar signals and by receiving reflections of the radar signals by the target object via the multitude of propagation channels.

The positions of the antennas of the first set may provide mutual distances between said individual antennas that generate the first differential phase shift for the first multitude of target angles. Likewise, the positions of the antennas of the second set may provide mutual distances between said individual antennas that generate the second differential phase shift for the second multitude of target angles.

The individual first propagation channels are established between individual pairs of transmit and receive antennas of the first set of antennas and the individual second propagation channels are established between individual pairs of transmit and receive antennas of the second set of antennas. The individual first propagation channels may exhibit different path lengths from their respective transmit antenna to the target object and back to their respective receive antenna.

The first differential phase shift is then caused by a path length difference between at least two of the individual first propagation channels. Likewise, the individual second propagation channels may exhibit different path lengths from their respective transmit antenna to the target object and back to their respective receive antenna. The second differential phase shift is then caused by a path length difference between at least two of the individual second propagation channels.

The respective first and second differential phase shifts may amount to differential phase shifts of radar signals transduced by neighboring antennas of the first and second set of antennas, respectively. The neighboring antennas may be, for example, neighboring receive antennas and/or neighboring transmit antennas.

The first set and/or second set of antennas may comprise or consist of three antennas, whereby one of the antennas is a transmit antenna and two of the antennas are receive antennas. The first and/or second differential phase shift then may be a phase shift among target reflections of radar signals that are received by the two receive antennas of the respective set when the target object is irradiated by a radar signal via the transmit antenna of the respective set.

If the first and/or second set of antennas comprise three antennas or consist of three antennas, two of the antennas may also be transmit antennas and one of the antennas may be a receive antenna. The first and/or second differential phase shift then may be a phase shift between a target reflection of a first radar signal that is received by the receive antenna of the respective set when the target object is irradiated by the first radar signal via one of the transmit antennas and a target reflection of a second radar signal received by the receive antenna of the respective set when the target object is irradiated by the second radar signal via the other one of the transmit antennas.

In general, each individual pair of one of the transmit antennas and one of the receive antennas within the individual sets of antennas may realize a separate propagation channel from the respective transmit antenna to the target object and back to the respective receive antenna. The antenna device is configured to irradiate the target object with electromagnetic radiation and for receiving reflections of the electromagnetic radiation by the target object via the individual propagation channels.

The signal processing device may be configured to resolve the individual propagation channels within the different sets of antennas, for example using separability parameters of the radar signals transduced via the antennas of the corresponding set. The signal processing device may determine the propagation and/or reflection properties of the individual propagation channels by comparing the radar signals that are transmitted and received via the antennas associated with the individual propagation channels.

The individual first radar signals and/or the individual second radar signals may exhibit individual and mutually independent signal parameters, such as phases, frequencies, amplitudes, chirps, phase shifts, code sequences, for example binary phase shift codes, and/or the like. The mutually independent signal parameters may constitute an orthogonal and linearly independent set of parameters. The individual and mutually independent signal parameters may amount to the separability parameters that ensure separability among the individual radar signals after reception, for example for distinguishing radar signals transmitted via different propagation channels.

The signal processing device may also be configured to evaluate the first radar signals transduced via the first propagation channels to construct a first virtual antenna array, such as a first multiple-input-multiple-output (MIMO) array, that generates the first differential phase shift for the first multitude of target angles. For example, the virtual antennas of the first virtual antenna array may have mutual distances, for example equal mutual distances, that generate the first differential phase shift for the first multitude of target angles. Additionally or alternatively, the signal processing device may be configured to evaluate the second radar signals transduced via the second propagation channels to construct a second virtual antenna array, such as a second MIMO array, that generates the second differential phase shift for the second multitude of target angles. For example, the virtual antennas of the second virtual antenna array may have mutual distances, such as equal mutual distances, that generate the second differential phase shift for the second multitude of target angles. The first virtual antenna array and/or the second virtual antenna array may be a uniform linear array (ULA).

According to the present disclosure, an antenna of the antenna device is generally formed by all antenna elements that collectively transduce between a radiation field of the antenna in the far-field region and an associated port signal handled by a radar circuit of the radar device. Such an antenna may comprise a single antenna element or it may be configured as an array antenna that comprises a set of antenna elements that form individual radiating elements of the antenna and coherently transduce between the radiation field and the port signal. If the antenna is a receive antenna, the radiation field is an incoming radiation field that is captured by the antenna elements. If the antenna is a transmit antenna, the radiation field is an outgoing radiation field generated by the antenna elements.

The radiation field of an antenna has well-defined instantaneous field parameters in the far-field of the antenna like phase center, frequency, amplitude and the like. Likewise, each antenna has antenna parameters that define the characteristics of the antenna and its radiation field. These antenna parameters may be a radiation pattern, polarization, gain, directivity, location of phase center or antenna position, and the like. In general, the positions of the individual antennas are defined by their respective phase centers.

At least one of the antennas of the first set may be configured as an antenna with shiftable phase center, wherein a first position of the phase center defines the position of the respective antenna of the first set and a shifted second position of the phase center defines a position of one of the antennas of the second set. The antenna featuring the shiftable phase center therefore constitutes one of the antennas of the first set when transducing radiation with the first phase center and one of the antennas of the second set when transducing radiation with the second phase center.

The radar device may comprise a radar circuit for generating and analyzing the radar signals. The radar circuit of the radar device can comprise, in some cases, all parts of the radar device that process the radar signals at the radar frequency used for illuminating the target objects. The radar circuit may thus constitute a radar front end of the radar device. The radar circuit may comprise a signal generator for generating the radar signals and a signal receiver for receiving and measuring the radar signals. The radar circuit may be configured as a transceiver comprising a transmitter, for example the signal generator, and the signal receiver.

In general, the radar circuit is configured to handle or transceive the radar signals. It may handle the radar signals by generating them at the signal generator based on at least one control signal, such as at least one digital control signal, and/or it may transceive the radar signals by evaluating or measuring them at the signal receiver to generate at least one data signal, such as at least one digital data signal. The radar signals may be routed between the radar circuit and the antenna device by sending them from the radar circuit to the antenna device and/or by sending them from the antenna device to the radar circuit.

For generating the radar signals from the at least one control signal, the signal generator comprises one or more transmit chains. Each transmit chain is configured to convert control signals into transmit radar signals and to output these transmit radar signals to one single signal port of the radar circuit that is connected to an antenna port of the antenna device.

Each transmit chain may comprise, for example, a digital to analog converter (DAC) that is controlled by the control signals controlling the transmit chain and/or one or several signal control devices that are likewise controlled by the control signals and shape the transmit radar signals generated by the transmit chain. Such signal control devices may be configured as, for example, variable attenuators or amplifiers, variable phase shifters, and/or the like. The signal generator may receive the control signals from the signal processing device of the radar device. The control signals may, for example, be digital control signals.

For generating the at least one data signal from the radar signals, the signal receiver comprises one or more receive chains. Each receive chain is configured to receive radar signals via a single signal port of the radar circuit that is connected to an antenna port of the antenna device, to convert received radar signals into data signals and to output the data signals to the signal processing device.

Each receive chain may comprise, for example, an analog to digital converter (ADC) that samples the radar signals and generates the data signals outputted by the receive chain and/or one or more signal conditioning devices such as low noise amplifiers, programmable filters, mixers, and/or the like that shape the radar signals prior to sampling. The data signals representing the receive radar signals may be digital data signals.

The individual transmit chains are coupled to the antenna device via individual transmit ports of the radar circuit and the individual receive chains are coupled to the antenna device via individual receive ports of the radar circuit. Each transmit port is coupled to one of the transmit chains of the radar circuit and is schematically located between the transmit chain and the antenna device and each receive port is coupled to one of the receive chains of the radar circuit and is schematically located between the receive chain and the antenna device. Each individual transmit port of the radar circuit may therefore be schematically located between the last signal control device of its associated transmit chain and the antenna device. Likewise, each receive port of the radar circuit may be schematically located between the antenna device and the first signal conditioning device of its associated receive chain. The transmit ports and the receive ports constitute signal ports of the radar circuit.

The radar signals that are routed via each individual signal port constitute port signals of the respective signal port.

The radar circuit may be configured to handle several independent port signals, for example to generate several independent transmit port signals from several independent control signals and/or to measure several independent receive port signals to generate several independent data signals. The signal generator may then comprise several transmit chains, one transmit chain for each transmit port signal and/or the signal receiver may then comprise several receive chains, one receive chain for each receive port signal. Each transmit chain is configured to generate an individual transmit port signal, the individual transmit port signals being mutually independent from each other. Likewise, each receive chain is configured to measure an individual receive port signal received from the antenna device, the individual receive port signals being mutually independent from each other.

According to certain examples of the present disclosure, a radar signal is defined as the signal that is transduced by an individual antenna of the antenna device. Likewise, a port signal is defined as the signal that is routed via an individual signal port of the radar circuit and that is processed by a single transmit chain or a single receive chain of the radar circuit. One port signal may comprise a single radar signal, for example if only one antenna is connected to the signal port routing the port signal, or it may comprise several radar signals, for example if more than one antenna is connected to a common signal port routing the port signal. In the latter case, each radar signal constitutes a separate signal portion of the port signal.

The radar circuit may be configured in an integrated circuit. The radar circuit may be configured in this single integrated circuit only or it may be distributed over one or more additional integrated circuits. The integrated circuits may be phase coherently coupled to each other. The integrated circuits may be configured, for example, as monolithic microwave integrated circuits (MMICs). The individual ports of the radar circuit may be physical connection points of one or several integrated circuits of the radar circuit, for example of a MMIC comprising the radar circuit. They also may be logical or conceptual ports that are located at signal lines between the transmit chains and the antenna device and/or at signal lines between the receive chains and the antenna device, respectively, for example in radar devices, in which individual components of the radar circuit and the antenna device are integrated on a common carrier, like a common substrate.

The antenna device generally transduces the radar signals. The antenna device may transduce the radar signals by converting them into electromagnetic radiation that is emitted towards the target object irradiated by the antenna device and/or it may transduce the radar signals by receiving electromagnetic radiation scattered back by the target object and by converting the received electromagnetic radiation into the radar signals. The individual antenna elements of an antenna may be conductively coupled to their respective signal port of the radar circuit. They also may be proximity coupled, for example via conductive or inductive coupling. The individual antennas may be configured as substrate integrated antennas such as microstrip patch antennas or slotted substrate integrated waveguide (SIW) antennas. They also may be configured as end-fire antennas, 3D antennas or metallized plastic antennas.

The radar device may be configured as a continuous wave (CW) radar device and the radar signals may exhibit a signal modulation that is used for determining the target distance and/or the velocity and/or the angular position of the target objects. Such a signal modulation may be a frequency modulation, a phase modulation, or the like. The radar device may therefore be configured as a frequency modulated continuous wave (FMCW) or as a phase modulated continuous wave (PMCW) radar device.

The FMCW radar device may employ simultaneous transmit and receive pulse Doppler (STAR PD) signals. With these STAR PD signals, the individual radar signals may each comprise a multitude of pulsed frequency sweeps. The individual frequency sweeps may each exhibit constant slope, for example constant falling linear slope. The signal processing device of the radar device may then be configured to transform each individual sweep into a set of range bins by performing a first Fourier transform, for example a fast Fourier transform, on the individual frequency sweeps. The signal processing device may further be configured to transform the individual range bins into Doppler bins via a second Fourier transform, for example a fast Fourier transform, whereby the second Fourier transform uses, for a given range bin, all signals for that specific range bin from all pulsed sweeps.

The individual radar signals are oscillating electromagnetic signals, such as microwave signals. The radar frequencies of the radar signals may be, for example, at least 1 GHz, at least 30 GHz, at least 60 GHz or at least 70 GHz. They may be, for example, at most 200 GHz, at most 100 GHz, at most 85 GHz, at most 60 GHz or at most 40 GHz. The radar frequencies of the radar signals may lie, for example, between 31 GHz and 37 GHz or between 75 GHz and 85 GHz, or between 76 GHz and 81 GHz.

The radar device may be mounted to a vehicle, such as an automotive vehicle and/or a land vehicle and/or a road vehicle, such as a car. The radar device may be used in automotive applications as an exterior radar to detect and locate target objects such as other vehicles, obstacles or lane boundaries. Such target objects may be placed at the front, at the rear or at the sides of a vehicle. The radar device may also be configured as an interior radar device that captures target reflection from a passenger compartment of the vehicle.

The radar device may be part of a vehicle control system and may be connected to a control device of the vehicle control system. The control device may be configured to perform advanced driver's assist functions, such as adaptive cruise control, emergency brake assist, lane change assist or autonomous driving, based on the data signals received from the radar device. The control device and/or the signal processing device of the radar device may be configured as programmable logic devices, such as programmable logic controllers, FPGAs, ASICs or microprocessors.

In general, the first multitude of target angles may comprise a number of target angles that differs from a number of target angles of the second multitude of target angles. For example, the antennas of the first and second set may be located at positions that provide the first differential phase shift for a number of target angles that is different from a number of target angles, for which the second differential phase shift is provided by the second set of antennas.

According to an embodiment, the first multitude comprises a first number of target angles and the second multitude comprises a second number of target angles, wherein the greatest common divisor of the first number of target angles and the second number of target angles equals one. Providing the antennas of the first and second set at positions that lead to said first and second number of target angles is one example possibility to generate the first and second multitudes of target angles in a way that they only have a single target angle in common.

For each propagation channel, the distance of the respective transmit antenna of the propagation channel to the respective receive antenna of the propagation channel provides an antenna spacing of the propagation channel. A differential antenna spacing of two propagation channels then is the difference between the antenna spacing of the first one of the two propagation channels and the antenna spacing of the second one of the two propagation channels. This differential antenna spacing generates a differential phase shift between radar signals that propagate via one of the propagation channels with respect to radar signals that propagate via the other one of the propagation channels. The differential antenna spacing of two propagation channels may be visualized as a virtual antenna array that comprises a single transmit antenna and two receive antennas that are separated by the differential antenna spacing.

The differential antenna spacing of two propagation channels is, for instance, the differential antenna spacing that is given by the difference in the spacing between the pair of antennas that establish the first one of the two propagation channels and the spacing between the pair of antennas that establish the second one of the two propagation channels.

According to an embodiment, respective spacings between pairs of antennas, such as transmit and receive antennas, establishing the individual first propagation channels may differ by a first differential antenna spacing and respective distances between pairs of antennas, such as transmit and receive antennas, establishing the individual second propagation channels may differ by a second differential antenna spacing, wherein the first differential antenna spacing is different from the second differential antenna spacing. This prevents the first and second multitude of target angles from only containing identical target angles.

The first and/or second set of antennas may each establish more than two propagation channels. In this case, the antennas of the virtual antenna array established from the first set of antennas may be spaced apart from each other by the same first differential antenna spacing and/or the antennas of the virtual antenna array established from the second set of antennas may be spaced apart from each other by the same second differential antenna spacing. In each case, this leads to equal phase shifts of radar signals that are received by neighboring antennas of the virtual array so that the first and/or second differential phase shift may be determined, for example, by performing a Fourier transform over the phases of the radar signals received by the individual antennas of the virtual antenna array.

According to an example embodiment, respective spacings between pairs of antennas, such as transmit and receive antennas, establishing the individual first propagation channels differ by a first differential antenna spacing and respective spacings between pairs of antennas, such as transmit and receive antennas, establishing the individual second propagation channels differ by a second differential antenna spacing. Thereby, the first differential antenna spacing is a first integer multiple of a fraction of the wavelength of the first radar signals and the second differential antenna spacing is a second integer multiple of the same fraction of the wavelength of the second radar signals, wherein the first multiple differs from the second multiple.

Providing the first and second propagation channels with differential antenna spacings that are different multiples of the same fraction of the wavelength of the respective first and second radar signals can help to ensure that, for instance, except for the unique target angle, all other target angles of the first multitude are distinctly different from all other target angles of the second multitude. This facilitates determination of the unique target angle by the signal processing device.

For example, with propagation channels that share the same transmit antenna, the differential antenna spacing is the distance between the respective receive antennas of the two propagation channels. Likewise, with propagation channels that share the same receive antenna, the differential antenna spacing is the distance between the respective transmit antennas of the two propagation channels. With propagation channels that are established between both different transmit antennas and different receive antennas, the differential antenna spacing is the difference between the spacing of the transmit and receive antenna of one of the propagation channels and the spacing of the transmit and receive antenna of the other one of the propagation channels.

The first fraction of the wavelength of the first radar signals and the second fraction of the wavelength of the second radar signals may, for example, equal one half. In particular, the first differential antenna spacing may be the first integer multiple of half the wavelength of the first radar signals, and the second differential antenna spacing may be the second integer multiple of half the wavelength of the second radar signals, wherein the first multiple differs from the second multiple.

For a differential antenna spacing that is an integer multiple of half the wavelength, the first and second differential phase shift reach ±180° at target angles of ±90°. Thus, the borders of the full field of view of the radar device, which lie at said target angles of ±90°, are mapped to the borders of the full range of possible differential phase shifts at ±180°. This can maximize the field of view of the radar device for a given number of target angles within the first and second multitude of target angles and provides for accurate angle finding.

According to an embodiment, the greatest common divisor of the first integer multiple and the second integer multiple equals one. This is one example possibility to provide antenna positions that generate only a single common target angle that is part of both the first and second multitude of target angles, irrespective of the angular position of the target object and the corresponding first and second differential phase shift.

According to an embodiment, all receive antennas of the first set of antennas have a mutual spacing that is larger than half the wavelength of the first radar signals, and all receive antennas of the second set of antennas have a mutual spacing that is larger than half the wavelength of the second radar signals.

According to an embodiment, all transmit antennas of the first set of antennas have a mutual spacing that is larger than half the wavelength of the first radar signals, and all transmit antennas of the second set of antennas have a mutual spacing that is larger than half the wavelength of the second radar signals.

Large spacings between the individual antennas reduce mutual coupling between the antennas and thus improves the signal quality of the radar signals, as well as the detection efficiency of the radar system. In general, spacings that are larger than half the wavelength of the corresponding radar signals would result in antenna positions that generate a single differential phase shift for more than one specific target angle and thus in ambiguous angle information provided by the radar device. With certain examples of the radar device of the present disclosure, these ambiguities are avoided by determining the angular position of the target angle from two individual multitudes of target angles obtained with two different sets of antennas.

In general, all individual antennas of the first set of antennas may have a mutual spacing that is larger than half the wavelength of the first radar signals, and/or all individual antennas of the second set of antennas may have a mutual spacing that is larger than half the wavelength of the second radar signals. For example, all antennas of the radar device, such as all antennas of the first and second set, may have mutual spacings that are larger than half the wavelength of the first radar signals and larger than half the wavelength of the second radar signals.

According to an embodiment, the signal processing device is configured to evaluate third radar signals propagating via third propagation channels established by a third set of antennas and to determine a third multitude of target angles from the third radar signals. The signal processing device furthermore is configured to determine the angular position of the target object as the unique target angle that is part of the first multitude of target angles, the second multitude of target angles and the third multitude of target angles.

The unique target angle that is determined by comparing the target angles of the first and second multitude of target angles may thus be used to unambiguously determine the angular position of the target object among the third multitude of target angles. The third set of antennas may comprise, for example, a larger number of antennas than the first and/or second set. Therefore, the angular position may be determined more accurately by the third set of antennas than with the first and/or second set.

For example, the signal processing device may be configured to determine a third differential phase shift that is acquired by the third radar signals while propagating via the third propagation channels. The antennas of the third set may then be located at positions that generate the third differential phase shift for the third multitude of target angles.

The third propagation channels may comprise at least part of, for example all of, the first and/or second propagation channels. This allows to use the antennas of the first and/or second set that establish the first and/or second propagation channels also for establishing the third propagation channels and provides for a technically simple and cost-effective radar device.

The signal processing device may be configured to jointly evaluate at least part, for example all, of the first radar signals transduced via the first propagation channels and/or at least part, for example all, of the second radar signals transduced via the second propagation channels to determine the third multitude of target angles. Thereby, at least some, such as all, of the propagation channels that are used to resolve ambiguities in the angular position of the target object may also be used to construct the third propagation channels.

According to an embodiment, the third propagation channels comprise the first and second propagation channels. The third propagation channels may furthermore comprise additional propagation channels. The third set of antennas may in total comprise at least two, such as three, transmit antennas and at least two, such as four, receive antennas.

According to an embodiment, the signal processing device is configured to determine the third multitude of target angles by constructing a common virtual antenna array from the third propagation channels. Such a common virtual antenna array allows for accurate angle determination. The virtual antenna array may, for example, be configured as a multiple-input-multiple-output (MIMO) array.

The individual virtual antennas of the common virtual antenna array may have mutual distances or differential antenna spacings that are larger than half the wavelength of the first radar signals and the wavelength of the second radar signals. The individual virtual antennas of the common virtual antenna array may, for example, have mutual distances or differential antenna spacings that generate the third differential phase shift for the third multitude of target angles.

According to an embodiment, the signal processing device is configured to establish a virtual antenna array from the first radar signals. This allows to determine the angular position of the target object with high accuracy and resolution. The signal processing device may, for example, be configured to determine the first differential phase shift by establishing the virtual antenna array from the first radar signals.

Mutual differential spacings of individual antennas of the virtual antenna array may, for example, be larger than half the wavelength of the first radar signals. Compared to spacings that are smaller than half a wavelength, this allows for a more accurate determination of the target angle from the differential phase shift. For example, all mutual differential spacings of the individual antennas of the virtual antenna array may be larger than half the wavelength of the first radar signals.

According to an embodiment, the signal processing device is configured to establish a further virtual antenna array from the second radar signals. For example, the signal processing device may be configured to determine the second differential phase shift by establishing the second virtual antenna array from the second radar signals.

The mutual spacings of individual antennas of the further virtual antenna array may be, for example, larger than half the wavelength of the second radar signals. For example, all mutual differential spacings of the individual virtual antennas of the further virtual antenna array may be larger than half the wavelength of the second radar signals.

According to an embodiment, the first radar signals occupy a first frequency band and the second radar signals occupy a second frequency band that is at least partly different from the first frequency band, for example that is separate from the first frequency band. This allows to use distinct first and second radar signals that occupy different frequency bands to resolve ambiguities in angle determination that occur when using only one of the first and second radar signals for angle determination.

The first and second frequency band may have a frequency gap in between them. The frequency gap may amount to, for example, at least a tenth, at least a fifth, at least a third or at least one half of the frequency span of the first and/or second frequency band. The frequency gap may amount to, for example, at most a tenth, at most a fifth, at most a third or at most one half of the frequency span of the first and/or second frequency band. Alternatively, the first frequency band may directly adjoin the second frequency band.

The first frequency band of the first antenna signal may lie between 75 GHz and 78 GHz, for example between 75.5 GHz and 77.5 GHz, and the second frequency band of the second antenna signal may lie between 79 GHz and 82 GHz, for example between 79.5 GHz and 81.5 GHz.

The antenna device may be configured as a frequency selective antenna device that transduces the first radar signals occupying the first frequency band via the antennas of the first set but not via the antennas of the second set and that transduces the second radar signals occupying the second frequency band via the antennas of the second set but not via the antennas of the first set.

The antennas of the first set may be configured to only transduce the first radar signals and not the second radar signals by suppressing transduction of the second radar signals compared to the first radar signals by, for example, at least 10 dB, at least 20 dB, at least 30 dB, at least 40 dB, or at least 50 dB. Likewise, the antennas of the second set may be configured to only transduce the second radar signals and not the first radar signals by suppressing transduction of the first radar signals compared to the second radar signals by, for example, at least 10 dB, at least 20 dB, at least 30 dB, at least 40 dB, or at least 50 dB.

Individual antennas of the first and second set may be located at the same position on the antenna device. These antennas may then transduce the first and second radar signals with coinciding phase centers. They may be configured as a single broadband antenna that represents one of the antennas of the first set when transducing one of the first radar signals occupying the first frequency band and that represents one of the antennas of the second set when transducing one of the second radar signals occupying the second frequency band.

The antennas may also comprise individual and separate antenna elements that only transduce one of the first and second radar signals but not the other one. The antenna elements of one of the antennas of the first set and the antenna elements of one of the antennas of the second set may then be located to generate coinciding phase centers of the respective antennas. To generate coinciding phase centers, these antenna elements may be located symmetrically next to each other and around their common phase center. For example, antenna elements of the antenna of the second set may be located symmetrically around the phase center of the antenna elements of the antenna of the first set.

The first and second set of antennas may, for example, each comprise a transmit antenna, both transmit antennas being located at the same position on the antenna device. Additionally or alternatively, the first and second set may each comprise a receive antenna, both receive antennas being located at the same position on the antenna device. Furthermore, the first and second set may each comprise an additional transmit or receive antenna, wherein these additional antennas are located at different positions on the antenna device.

The individual radar signals occupying the same frequency band may exhibit mutually independent, for example mutually orthogonal, separability parameters that distinguish them from each other. For example, the individual first radar signals may exhibit individual first separability parameters that distinguish them from each other and the individual second radar signals may exhibit individual second separability parameters that distinguish them from each other. As all first radar signals are distinguishable from all second radar signals by their frequency band for certain example embodiments, the same values of separability parameters may be used for one of the first radar signals and one of the second radar signals.

According to an embodiment, the radar device comprises a radar circuit for generating and/or evaluating the radar signals, wherein the radar circuit is coupled to the antenna device via a multitude of ports of the radar circuit. At least one of the ports thereby is configured as a common signal port that routes both one of the first radar signals and one of the second radar signals between the radar circuit and the antenna device. This allows establishing the first and second propagation channels and thus unambiguous determination of the target angle with only a limited number of signal ports.

The radar circuit may comprise several common signal ports, each of which being coupled to one of the antennas of the first set and one of the antennas of the second set. For example, each of the antennas of the first and second set may be coupled together with one of the antennas of the respective other set to a common signal port of the radar circuit. With other embodiments, each of the antennas of the first set may be coupled together with one of the antennas of the second set to a common signal port of the radar circuit, and the second set may comprise additional antennas that are coupled to additional signal ports. Or each of the antennas of the second set may be coupled together with one of the antennas of the first set to a common signal port of the radar circuit, and the first set may comprise additional antennas that are coupled to additional signal ports.

If the first radar signals occupy the first frequency band and the second radar signals occupy the second frequency band, the radar circuit may be configured to activate dedicated antennas, such as the first antennas transducing the first radar signal or the second antennas transducing the second radar signal, by varying or switching its operating frequency band. Therefore, the full bandwidth of the radar circuit that is routed via the common signal ports may be shared among two or more antennas.

Frequency selective activation of the antennas may, for example, be realized by employing a frequency selective first antenna and a frequency selective second antenna that are directly and simultaneously coupled to the common signal port. It may also be realized by coupling the first and second antenna to the common signal port via a signal routing device such as a frequency selective multiplexer or a switching device that selectively couples the first antenna or the second antenna to the common signal port. Frequency selectivity may also be realized by coupling the first antenna via a first filter and/or the second antenna via a second filter to the common signal port, wherein the first filter passes the first frequency band and blocks the second frequency band, and wherein the second filter passes at least the second frequency band.

The common signal port routing the respective ones of the first and second radar signals may be a transmit port of the radar device. Alternatively, the common signal port may be a receive port of the radar device.

With the common signal port being a transmit port, a single port signal generated by a single transmit chain comprises or constitutes the first and second radar signal, for example it may comprise the first radar signal as a first signal portion and the second radar signal as a second signal portion. The port signal may consist of the first and second signal portion only or it may comprise further signal portions, for example a third signal portion.

With the common signal port being a receive port, a single port signal received by a single receive chain comprises or constitutes the first and second radar signal, for example it may comprise the first radar signal as a first signal portion and the second radar signal as a second signal portion. The port signal may consist of the first and second signal portion only or it may comprise further signal portions, for example a third signal portion.

The signal processing device may be configured to separate the first radar signal and the second radar signal from each port signal received via a common signal port, for example by filtering out the first frequency band to obtain the first radar signal and by filtering out the second frequency band to obtain the second radar signal. Filtering may be performed by analog filtering prior to sampling and/or by digital filtering after sampling.

If the radar circuit comprises an integrated circuit, the common signal port may be configured as an external connection point of the integrated circuit. Routing the respective ones of the first and second radar signals via the common signal port then effectively doubles the individual antenna positions and propagation channels that are addressable via the connection point forming the common signal port.

According to an embodiment, the radar circuit for generating and/or evaluating the radar signals is configured as a single integrated circuit. This allows for the construction of a compact and cost-effective radar device.

In another aspect, the present disclosure is directed at a vehicle, such as an automotive vehicle and/or a land vehicle and/or a road vehicle, for example a car, with a radar device according to the present disclosure. The radar device may be a front radar of the vehicle. All embodiments and effects that are disclosed in connection with the radar device also apply to the vehicle of the present disclosure and vice versa.

The present disclosure is further directed at a method for operating a radar device, for example for automotive applications, wherein the radar device comprises an antenna device and a signal processing device and wherein the method comprises: irradiating a target object with radar signals and receiving reflections of the radar signals by the target object via a multitude of propagation channels, determining, with the signal processing device, a first differential phase shift among first radar signals propagating via first propagation channels that are established by a first set of antennas of the antenna device, wherein the antennas of the first set are located at positions that generate the first differential phase shift for a first multitude of target angles, determining, with the signal processing device, a second differential phase shift among second radar signals propagating via second propagation channels that are established by a second set of antennas of the antenna device, wherein the antennas of the second set are located at positions that generate the second differential phase shift for a second multitude of target angles, and determining the angular position of the target object as a unique target angle that is part of both the first multitude of target angles and the second multitude of target angles with the signal processing device.

The method may be performed by the radar device according to the present disclosure. Therefore, all embodiments and effects disclosed in relation to the radar device also pertain to the method according to the present disclosure and vice versa.

BRIEF DESCRIPTION OF THE DRAWINGS

Example embodiments and functions of the present disclosure are described herein in conjunction with the following drawings, showing schematically:

FIG. 5 illustrates a part of an example virtual antenna array established by a signal processing device of the radar device;

FIG. 6 illustrates a second embodiment of the radar device according to the present disclosure;

FIG. 7 illustrates a third embodiment of the radar device according to the present disclosure;

DETAILED DESCRIPTION

Figure 1:
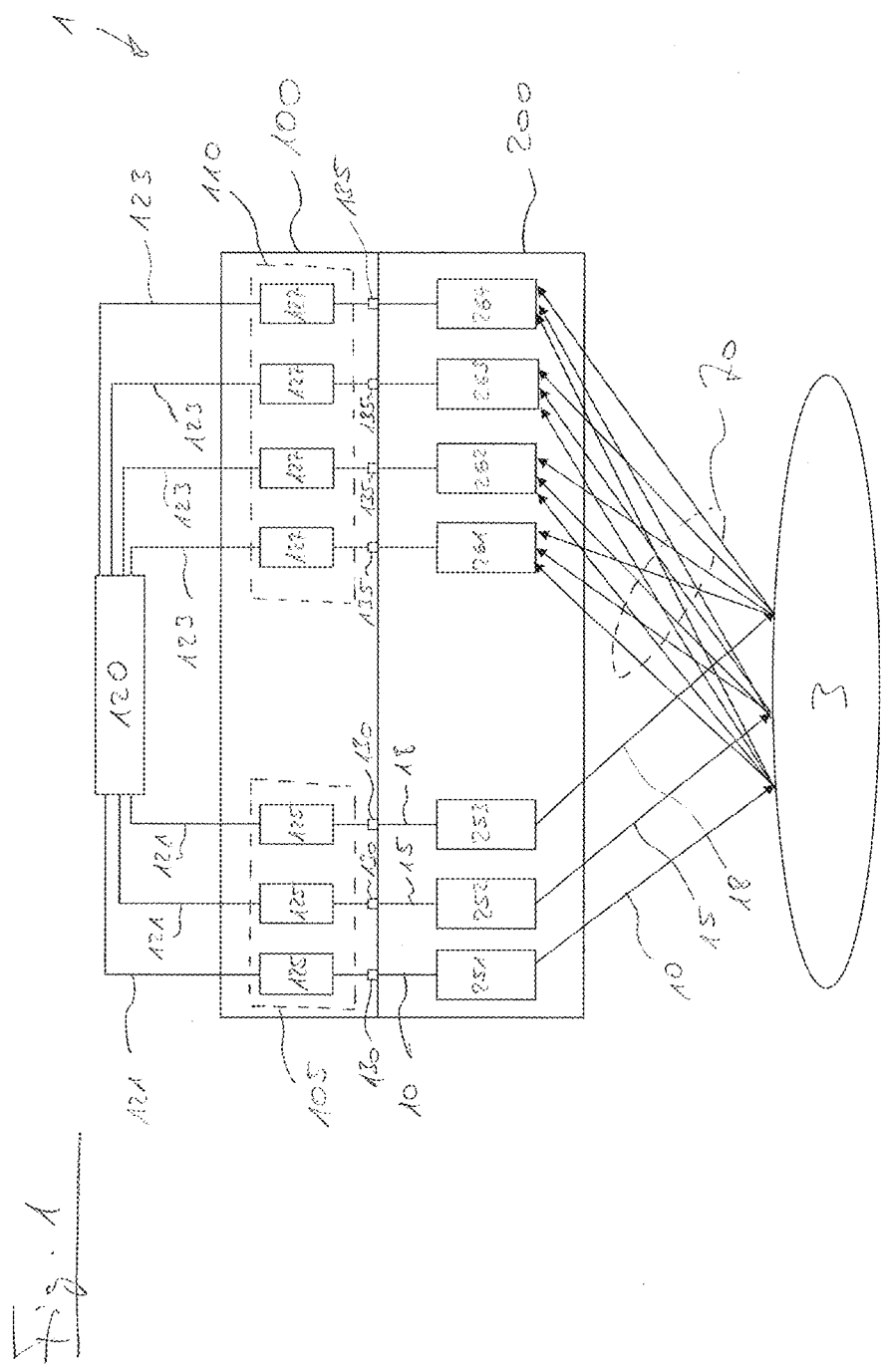
FIG. 1 illustrates a first embodiment of a radar device according to the present disclosure.

FIG. 1 depicts a first embodiment of a radar device 1 according to the present disclosure. The radar device 1 has a radar circuit 100, an antenna device 200 and a signal processing device 120. The radar circuit 100 comprises a signal generator 105 having three transmit chains 125. Each transmit chain 125 is coupled via a transmit signal port 130 to the antenna device 120. Thereby, a first one of the transmit chains 125 is coupled to a first transmit antenna 251, a second one of the transmit chains 125 is coupled to a second transmit antenna 252 and a third one of the transmit chains 125 is coupled to a third transmit antenna 253 of the antenna device 200. The transmit antennas 251, 252, 253 are located at separate positions on the antenna device 200.

The individual transmit chains 125 are connected to the signal processing device 120 to receive individual control signals 121. Based on a first one of the control signals 121, the transmit chain 125 connected to the first transmit antenna 251 generates a first radar signal 10. Likewise, the transmit chain 125 connected to the second transmit antenna 252 generates a second radar signal 15 based on a second one of the control signals 121, and the transmit chain 125 connected the third transmit antenna 253 generates a third radar signal 18 based on a third one of the control signals 121. The individual radar signals 10, 15, 18 are routed via the transmit signal ports 130 as individual port signals.

The first transmit antenna 251 transduces the first radar signal 10, the second transmit antenna 252 transduces the second radar signal 15 and the third transmit antenna 253 transduces the third radar signal 18 by irradiating the respective radar signal 10, 15, 18 towards a target object 3, with the target object 3 being positioned in front of the antenna device 200. The target object 3 reflects the first, second and third radar signal 10, 15, 18 at least partly back to the antenna device 200.

To receive the reflections of the radar signals 10, 15, 18 from the target object 3, the antenna device 200 comprises a first receive antenna 261, a second receive antenna 262, a third receive antenna 263 and a fourth receive antenna 264. Each receive antenna 261, 262, 263, 264 is configured to transduce target reflections of all three radar signals 10, 15, 18. The received target reflections of the radar signals 10, 15, 18 are routed from the individual receive antennas 261, 262, 263, 264 via individual receive signal ports 135 to individual receive chains 127 of a signal receiver 110 of the radar circuit 100. Thereby, each individual receive chain 127 receives the target reflections of all three radar signals 10, 15, 18 that are received by the receive antenna 261, 262, 263, 264 that is connected to the respective receive chain 127.

The individual target reflections of the radar signals 10, 15, 18 that are transduced by a single one of the receive antennas 261, 262, 263, 264 are routed as individual signal portions of a single port signal via the receive signal port 135 to the respective receive chain 127. Therefore, each receive chain 127 receives a port signal that comprises as a first signal portion the target reflection of the first radar signal 10 that is captured by the associated receive antenna 261, 262, 263, 264, as a second signal portion the target reflection of the second radar signal 15 that is captured by the associated receive antenna 261, 262, 263, 264, and as a third signal portion the target reflection of the third radar signal 18 that is captured by the associated receive antenna 261, 262, 263, 264.

Each individual receive chain 127 generates a radar data signal 123 that represents the target reflections captured by the receive antenna 261, 262, 263, 264 that is connected to the respective receive chain 127. The radar data signals 123 are routed to the signal processing device 120, which is connected to the individual receive chains 127, for evaluation and further processing.

The individual transmit chains 125 generate the individual radar signals 10, 15, 18 with different values of a separability parameter, such as phase coding, for example binary phase coding. Using the separability parameter, the signal processing device 120 is configured to separate the individual signal portions of the port signal processed by a single receive chain 127 and to determine the target reflection of the first radar signal 10, the target reflection of the second radar signal 15 and the target reflection of the third radar signal 18 that are transduced by the associated receive antenna 261, 262, 263, 264.

In the illustrated example, the radar device 1 establishes a total of twelve different propagation channels 70 from the antenna device 200 to the target object 3 and back to the antenna device 200. Thereby, four propagation channels are established from the first transmit antenna 251 to the individual receive antennas 261, 262, 263, 264, four additional propagation channels are established from the second transmit antenna 252 to the individual receive antennas 261, 262, 263, 264, and four further propagation channels are established from the third transmit antenna 253 to the individual receive antennas 261, 262, 223, 264. The signal processing device 120 is configured to separately detect the target reflections propagating via the individual propagation channels 70 to establish a virtual antenna array in a MIMO configuration.

With the radar device 1 shown in FIG. 1, the individual antennas 251, 252, 253, 261, 262, 263, 264 may each comprise a single antenna element or several antenna elements. The antenna elements forming a single antenna 251, 252, 253, 261, 262, 263, 264 are then all connected to a single signal port 130, 135 of the radar circuit 100.

Alternative embodiments of the radar device 1 shown in FIG. 1 may comprise a different number of transmit chains 125 and transmit antennas 251, 252, 253, as well as a different number of receive chains 127 and receive antennas 261, 262, 263, 264. The signal processing device 120 is in general configured to establish a separate propagation channel for each individual pair of transmit and receive antennas 251, 252, 253, 261, 262, 263, 264.

Figure 2:
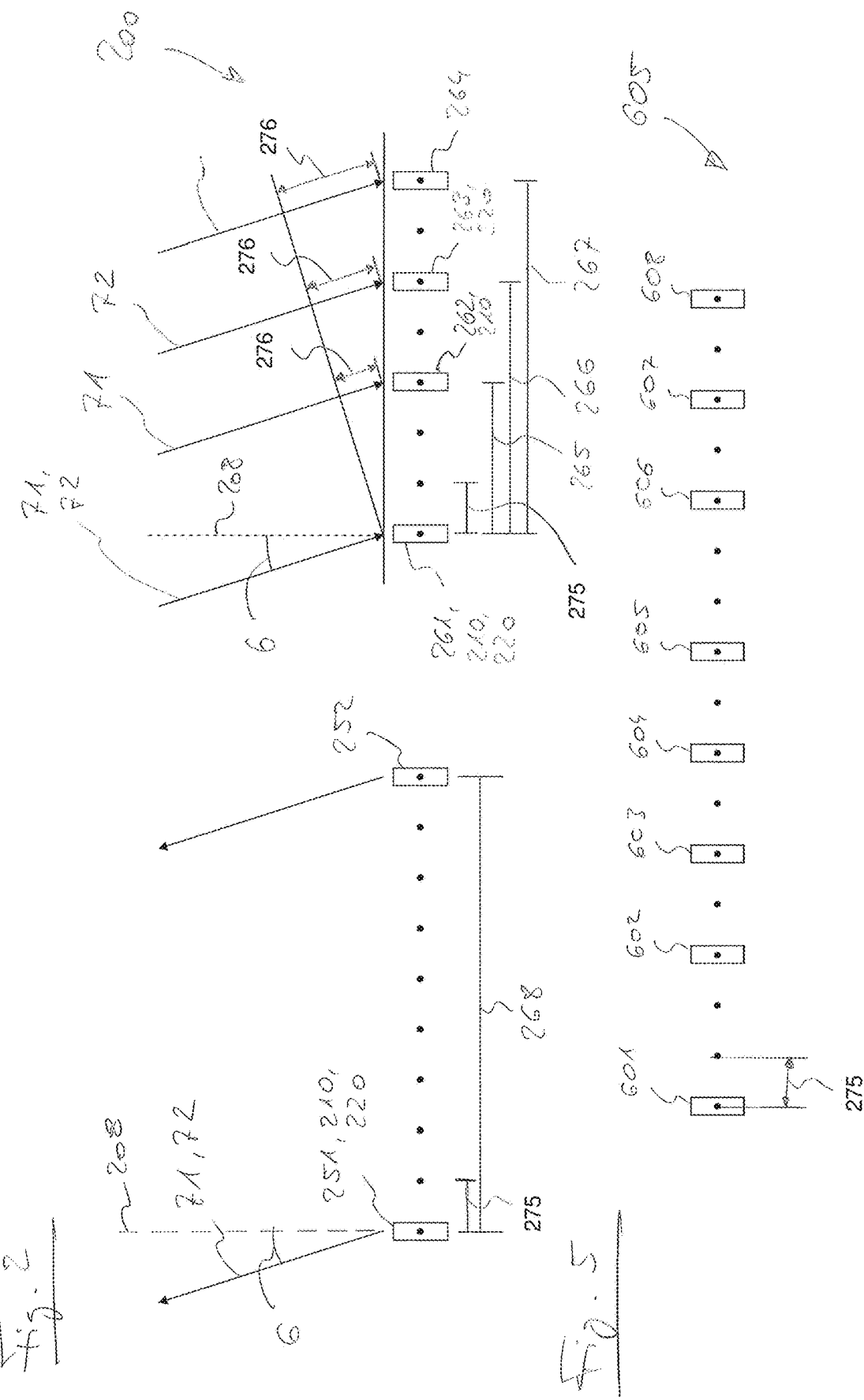
FIG. 2 illustrates an example placement of antennas of the radar device shown in FIG. 1.

FIG. 2 shows an example placement of the first and second transmit antenna 251, 252 and the first, second, third and fourth receive antenna 261, 262, 263, 264 on the antenna device 200 of the radar device 1 shown in FIG. 1.

The receive antennas 261, 262, 263, 264 are located at positions that establish a first spacing 265 between the first receive antenna 261 and the second receive antenna 262, a second spacing 266 between the first receive antennas 261 and the third receive antenna 263 and a third spacing 267 between the first receive antenna 261 and the fourth receive antenna 264. Furthermore, the first and second transmit antenna 251, 252 are located at positions that establish a fourth spacing 268 between these two antennas 251, 252.

The first spacing 265 amounts to three times the half 275 of the wavelength of the radar signals 10, 15, 18, the second spacing 266 amounts to five times the half 275 of the wavelength, the third spacing 267 corresponds to seven times the half 275 of the wavelength and the fourth spacing 268 corresponds to nine times the half 275 of the wavelength. With some example operations of the radar device 1 shown in FIG. 1, all radar signals 10, 15, 18 occupy the same frequency band. The wavelength of the radar signals 10, 15, 18 may then amount to the wavelength of a frequency within this frequency band.

In general, the mutual distances between the individual receive antennas 261, 262, 263, 264 are larger than the half 275 of the wavelength, and the mutual distances between the individual transmit antennas 251, 252, 253 are also larger than the half 275 of the wavelength.

The first spacing 265 provides an isolation from 30 dB to 40 dB between the first and second receive antenna 261, 262, whereas isolation between the second and third receive antenna 262, 263 and between the third and fourth receive antenna 263, 264 amounts to around 30 dB. Isolation between the first and second transmit antenna 251, 252 is more than 50 dB.

The first transmit antenna 251, the first receive antenna 261 and the second receive antenna 262 form a first set 210 of antennas, and the first transmit antenna 251, the first receive antenna 261 and the third receive antenna 263 form a second set 220 of antennas. The first set 210 of antennas establishes first propagation channels 71, namely one first propagation channel 71 between the first transmit antenna 251 and the first receive antenna 261 and another first propagation channel 71 between the first transmit antenna 251 and the second receive antenna 262. Likewise, the second set 220 of antennas establishes second propagation channels 72, namely one second propagation channel 72 between the first transmit antenna 251 and the first receive antenna 261 and another second propagation channel 72 between the first transmit antenna 251 and the third receive antenna 263.

Since the first transmit antenna 251 constitutes the transmit antennas of both first propagation channels 71, the distances between the transmit and receive antennas establishing the individual first propagation channels 71 differ by a first differential antenna spacing that is equal to the first spacing 265 between the first receive antenna 261 and the second receive antenna 262. Likewise, the first transmit antenna 251 also constitutes the transmit antennas of both second propagation channels 72. Therefore, the distances between the transmit and receive antennas establishing the individual second propagation channels 72 differ by a second differential antenna spacing that is equal to the second spacing 266 between the first receive antenna 261 and the third receive antenna 263.

Since the target object 3 is positioned in the far field of the antenna device 200, all radar signals 10, 15, 18 transmitted by the transmit antennas 251, 252, 253 and all target reflections of the radar signals 10, 15, 18 received by the receive antennas 261, 262, 263, 264 are regarded as traveling parallel to each other. The angular position of the target object 3, which is characterized by a target angle 6 relative to a normal 208 to the plane of the antenna device 200, thereby leads to an oblique incidence of the target reflections, the target reflections having the target angle 6 relative to normal 208. The individual spacings 265, 266, 267 among the receive antennas 261, 262, 263, 264 then lead to path length differences 276 among propagation channels 71, 72 that originate from the same transmit antenna 251, 252, 253.

These path length differences 276 translate into differential phase shifts among the radar signals 10, 15, 18 traveling via the individual propagation channels 71, 72, and the signal processing device 120 is configured to determine the differential phase shift among the radar signals 10, 15, 18 traveling via the first propagation channels 71 and the differential phase shift among the radar signals traveling via the second propagation channels 72.

The differential phase shift for a pair of propagation channels 70, 71 is given by $$\Delta \varphi = \frac{2\pi}{\lambda} d \, \sin(\vartheta),$$

with $\lambda$ the wavelength of the radar signals, d the differential antenna spacing of the two propagation channels 70, 71 and $\vartheta$ the target angle 6. To unambiguously relate a distinct differential phase shift $\Delta \varphi$ to a target angle 6 between $\vartheta=-90°$ and $\vartheta=+90°$, the differential antenna spacing d of the individual propagation channels 71, 72 therefore would have to be smaller than the half 275 of the wavelength $\lambda$. Since this is not the case for the first and second propagation channels 71, 72, the differential phase shift determined by the signal processing device 120 exhibit ambiguities in the sense that the same differential phase shift may be caused by a multitude of target angles 6.

For example, the differential antenna spacing between the pair of antennas 251, 261 that establishes the first one of the first propagation channels 71 and the pair of antennas 251, 262 that establishes the second one of the first propagation channels 71 amounts to the first spacing 265 between the first receive antenna 261 and the second receive antenna 262. Likewise, the differential antenna spacing between the pair of antennas 251, 261 that establishes the first one of the second propagation channels 72 and the pair of antennas 251, 263 that establishes the second one of the second propagation channels 72 amounts to the second spacing 266 between the first receive antenna 261 and the third receive antenna 263.

As another example, a differential antenna spacing between the pair of antennas that includes the first transmit antenna 251 and the first receive antenna 261 and that establishes the first one of the first propagation channels 71 and the pair of antennas that is formed by the second transmit antenna 252 and the second receive antenna 262 amounts to the sum of the fourth spacing 268 and the first spacing 265.

Figure 3:
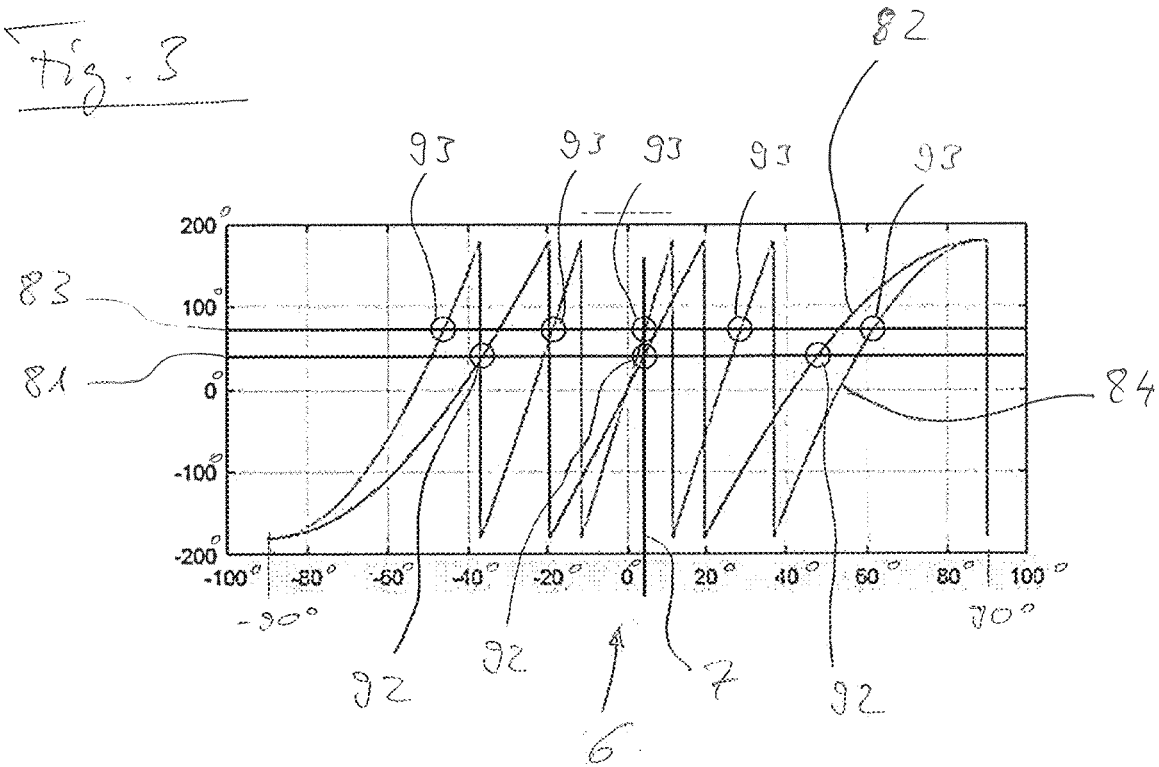
FIG. 3 illustrates an example dependency of differential phase shifts among radar signals traveling via first and second propagation channels on a target angle, as well as an example first and second multitude of target angles.

The ambiguities of the differential phase shift determined by the signal processing device 120 are illustrated in FIG. 3, which depicts the dependency of the differential phase shift 82 among the radar signals 10, 15, 18 traveling via the first propagation channels 71 on the target angle 6 and the dependency of the differential phase shift 84 among the radar signals traveling via the second propagation channels 72 on the target angle 6.

The first differential antenna spacing among the antennas 251, 261, 262 of the first set 210 of antennas leads to a first multitude 92 of three target angles that are generated for a given angular position of the target object 3. Likewise, the second differential antenna spacing among the antennas 251, 261, 263 of the second set 220 of antennas leads to a second multitude 93 of five target angles that are generated for a given angular position of the target object 3.

As it is shown in FIG. 3 for a given angular position of the target object 3, the signal processing device 120 determines a first differential phase shift 81 among the radar signals 10, 15, 18 traveling via the first propagation channels 71 that translates into the target angles of the first multitude 92 and the signal processing device 120 furthermore determines a second differential phase shift 83 among the radar signals 10, 15, 18 traveling via the second propagation channels 72 that translates into the second multitude 93 of target angles.

In certain examples, the differential antenna spacing among the antennas 251, 261, 262 that establish the first propagation channels 71 is a first integer multiple, namely three times, of the half 275 of the wavelength of the radar signals 10, 15, 18 and the differential antenna spacing among the antennas 251, 261, 263 that establish the second propagation channels 72 is a second integer multiple, namely five times, of the half 275 of the wavelength of the radar signals 10, 15, 18. The first multitude 92 of target angles and the second multitude 93 of target angles then have a unique target angle 7 in common that represents the actual angular position of the target object 3. With the example angular position shown in FIG. 3, the unique target angle 7 amounts to roughly 5°.

Figure 4:
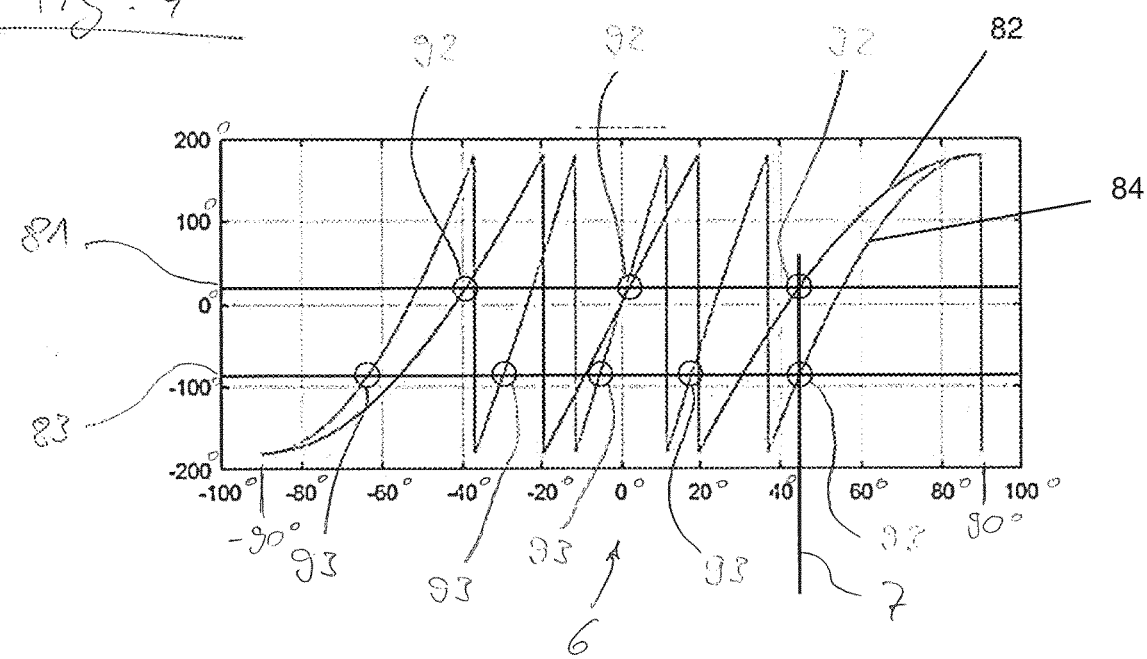
FIG. 4 illustrates the dependency of the differential phase shifts on the target angle, as well as further first and second multitudes of target angles.

FIG. 4 shows the first multitude 92 of target angles and the second multitude 93 of target angles that result from a different pair of differential phase shifts 81, 83 determined by the signal processing device 120. Thereby, the first and second multitude 92, 93 have a unique target angle 7 in common that roughly amounts to 45°.

In some cases, the signal processing device 120 is furthermore configured to determine the angular position of the target object 3 by constructing a virtual antenna array from third propagation channels, whereby the third propagation channels can comprise all propagation channels 70 that are established between the individual transmit antennas 251, 252, 253 and the individual receive antennas 261, 262, 263, 264 of the antenna device 200. The third propagation channels then also comprise the first propagation channels 71 and the second propagation channels 72.

FIG. 5 shows a part of the example virtual antenna array 600 that is established by the propagation channels 70 established by the first and second transmit antennas 251, 252 and all of the receive antennas 261, 262, 263, 264 of the antenna device 200. This part of the virtual antenna array 600 comprises a first virtual antenna 601 established from the first propagation channel 71 between the first transmit antenna 251 and the first receive antenna 261, a second virtual antenna 602 established from the first propagation channel 71 between the first transmit antenna 251 and the second receive antenna 261, a third virtual antenna 603 established from the second propagation 72 channel between the first transmit antenna 251 and the third receive antenna 263 and a fourth virtual antenna 604 established from a propagation channel 70 between the first transmit antenna 251 and the fourth receive antenna 264.

A virtual antenna spacing between the first and second virtual antennas 601, 602 amounts to the differential antenna spacing of the antennas of the corresponding propagation channels 70, 71, namely to the differential antenna spacing between the pair of antennas formed by the first transmit antenna 251 and the first receive antenna 261 and the pair of antennas formed by the first transmit antenna 251 and the second receive antenna 262. This differential antenna spacing is equal to the difference of the distance between the first transmit antenna 251 and the first receive antenna 261 and the distance of the first transmit antenna 251 and the second receive antenna 262, hence equal to the first spacing 265. A virtual antenna spacing between the first and third virtual antenna 601, 603 equals the differential antenna spacing between the pair of antennas formed by the first transmit antenna 251 and the first receive antenna 261 and the pair of antennas formed by the first transmit antenna 251 and the third receive antenna 263. This differential antenna spacing is equal to the second spacing 266. A virtual antenna spacing between the first and fourth virtual antenna 601, 604 equals the differential antenna spacing between the pair of antennas formed by the first transmit antenna 251 and the first receive antenna 261 and the pair of antennas formed by the first transmit antenna 251 and the fourth receive antenna 264. This differential antenna spacing is equal to the third spacing 267.

Furthermore, the part of the virtual antenna array 600 shown in FIG. 5 comprises a fifth virtual antenna 605 established from a propagation channel 70 between the second transmit antenna 252 and the first receive antenna 261, a sixth virtual antenna 606 established from a propagation channel 70 between the second transmit antenna 252 and the second receive antenna 262, a seventh virtual antenna 607 established from a propagation channel 70 between the second transmit antenna 252 and the third receive antenna 263 and an eighth virtual antenna 608 established from a propagation channel 70 between the second transmit antenna 252 and the fourth receive antenna 264.

A virtual antenna spacing between the first and fifth virtual antenna 601, 605 is equal to the fourth spacing 268, a virtual antenna spacing between the first and sixth virtual antenna 601, 606 is equal to the sum of the first spacing 265 and the fourth spacing 268, a virtual antenna spacing between the first and seventh virtual antenna 601, 607 is equal to the sum of the second spacing 266 and the fourth spacing 268 and a virtual antenna spacing between the first and eighth virtual antenna 601, 608 is equal to the sum of the third spacing 267 and the fourth spacing 268.

With the virtual antenna array 600, which is only partly shown in FIG. 5, all virtual antennas 601, 602, 603, 604, 605, 606, 607, 608 can have a mutual spacing that is larger than the half 275 of the wavelength of the radar signals 10, 15, 18.

FIG. 6 shows a second embodiment of the radar device 1 according to the present disclosure. As far as no differences are described or apparent from the Figures, the second embodiment of the radar device 1 can be configured as it is disclosed in connection with the first embodiment and vice versa.

With the second embodiment of the radar device 1, the first transmit antenna 251 is connected together with a fourth transmit antenna 254 to a common signal port 131 of the radar circuit 100. The transmit chain 125 that is connected to the common signal port 131 is configured to generate the first radar signal 10, which occupies a first frequency band, and to generate a fourth radar signal 19 that occupies a second frequency band that is different from the first frequency band. Therefore, a port signal routed via the common signal port 131 comprises the first radar signal 15 as a first signal component and the fourth radar signal 19 as a second signal component. The remaining transmit chains 125 generate the second and third radar signal 15, 18 with frequencies that occupy the first frequency band.

The first transmit antenna 251 is configured to selectively transduce the first radar signal 10 but not the fourth radar signal 19, and the fourth transmit antenna 254 is configured to selectively transduce the fourth radar signal 19 but not the first radar signal 10.

The antenna device 200 of the second embodiment of the radar device 1 furthermore comprises a fifth receive antenna 269 that is connected together with the first receive antenna 261 via a common signal port 131 to a single one of the receive chains 127. Furthermore, the antenna device 200 comprises a sixth receive antenna 270 that is connected together with the second receive antenna 262 via a further common signal port 131 to a further single one of the receive chains 127. The first, second, third and fourth receive antenna 261, 262, 263, 264 are configured to selectively transduce the radar signals 10, 15, 18 that occupy the first frequency band but to block the radar signals 19 that occupy the second frequency band and the fifth and sixth receive antenna 269, 270 are configured to selectively transduce the radar signals 19 that occupy the second frequency band but to block the radar signals 10, 15, 18 that occupy the first frequency band. Port signals that are routed via the common signal ports 131 connected to the receive chains 127 then comprise target reflections of the radar signals 10, 15, 18 occupying the first frequency band as a first signal portion and target reflections of the radar signals 19 occupying the second frequency band as a second signal portion.

The first transmit antenna 251 and the first and second receive antennas 261, 262 form the first set 210 of antennas and are located at positions that generate the first differential phase shift 81 for the first multitude 92 of target angles. The fourth transmit antenna 254 and the fifth and sixth receive antennas 269, 270 form the second set 220 of antennas and are located at positions that generate the second differential phase shift 83 for the second multitude 93 of target angles.

At least one of the antennas 254, 269, 270 of the second set 220 has a position that is different from the positions of the antennas 251, 261, 262 of the first set 210. According to one specific embodiment, two of the antennas 254, 269, 270 of the second set 220 are located at the same position as two of the antennas 251, 261, 262 of the first set 210. For example, the fourth transmit antenna 254 may have the same position as the first transmit antenna 251 and the fifths receive antenna 269 may have the same position as the first receive antenna 261, while the sixth receive antenna 270 has a different position than the second receive antenna 262. According to another specific embodiment, all of the antennas 254, 269, 270 of the second set 220 are located at positions that differ from the positions of the antennas 251, 261, 262 of the first set 210.

FIG. 7 shows a third embodiment of the radar device 1 according to the present disclosure. As long as no differences are described or apparent from the Figures, the third embodiment of the radar device 1 can be configured as it is disclosed in connection with the first and/or second embodiments and vice versa.

With the radar device shown in FIG. 7, all signal ports 130, 135 are configured as common signal ports 131. To each common signal port 131, two antennas of the antenna device 200 are connected. For each common signal port 131, the antenna device 200 is configured to selectively transduce the radar signals that occupy the first frequency band via one of the antennas connected to the respective common signal port 131 and to selectively transduce the radar signals that occupy the second frequency band via the other one of the antennas connected to the respective signal port 131.

To this end, the individual antennas are connected to their respective common signal port via signal routing devices 230. The signal routing devices 230 are configured to selectively route the radar signals occupying the first frequency band between the individual common signal ports 231 and one of the connected antennas and to selectively route the radar signals occupying the second frequency band between the individual common signal ports 231 and the other one of the connected antennas. The signal routing devices 230 may be configured, for example, as switching devices, multiplexers, filters or the like.

Besides the fourth transmit antenna 254, the antenna device 200 comprises two further transmit antennas 255 that also transduce the radar signals occupying the second frequency band, each of the further transmit antennas 255 being connected to one of the remaining transmit ports 130. Furthermore, besides the fifths receive antenna 269 and the sixth receive antenna 270, the antenna device 200 comprises two further receive antennas 271 that transduce the radar signals occupying the second frequency band, each of the further transmit antennas 271 being connected to one of the remaining receive ports 135.

The signal processing device 120 is configured to determine a first differential phase shift from a first virtual antenna array that is constructed from propagation channels established by the antennas 251, 252, 253, 261, 262, 263, 264 that transduce within the first frequency band. Furthermore, the signal processing device 120 is configured to determine a second differential phase shift from a second virtual antenna array that is constructed from propagation channels established by the antennas 254, 255, 269, 270, 271 that transduce within the second frequency band.

In certain examples, virtual antennas of the first virtual antenna array have an antenna spacing that is a first integer multiple, namely five times, half a wavelength of radar signals within the first frequency band and virtual antennas of the second virtual antenna array have an antenna spacing that is a second integer multiple, namely seven times, of a wavelength of radar signals within the second frequency band. For a given target angle 6, a first differential phase shift among the radar signals propagating via the propagation channels of the first virtual antenna array is then generated for a first multitude of five target angles and a second differential phase shift among the radar signals propagating via the propagation channels of the second virtual antenna array is then generated for a second multitude of seven target angles. The signal processing device 120 is configured to determine the angular position of the target object 3 as the unique target angle that is part of both the first and second multitude of target angles.

With alternative embodiments, the radar device 1 shown in FIG. 7 may also comprise the frequency selective antennas that are described in connection with the second embodiment of the radar device shown in FIG. 6 instead of the signal routing devices 230. Likewise, the radar device shown in FIG. 6 may also comprise the signal routing devices 230. As it is also shown by way of example in FIG. 7, all embodiments of the radar device 1 according to the present disclosure may have antennas that comprise a multitude of antenna elements 213.

Figure 8:
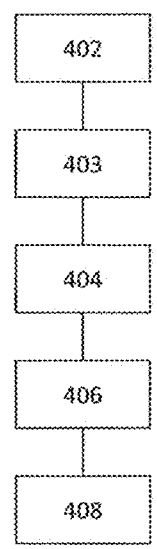
FIG. 8 illustrates an example method for operating the radar devices according to the present disclosure.

FIG. 8 depicts an example method 400 for operating a radar device 1 according to the present disclosure. The method 400 comprises irradiating 402 the target object 3 with the radar signals 10, 15, 18, 19 and receiving 403 reflections of the radar signals 10, 15, 18, 19 by the target object 3 via the propagation channels 70, 71, 72. Thereby, the steps of irradiating 402 and receiving 403 may at least partly be performed simultaneously. The method 400 further comprises determining 404 the first differential phase shift 81 with the signal processing device 120 and determining 406 the second differential phase shift 83 with the signal processing device 120. Furthermore, the method 400 comprises determining 480 the angular position of the target object 3 as the unique target angle 7.

Figure 9:
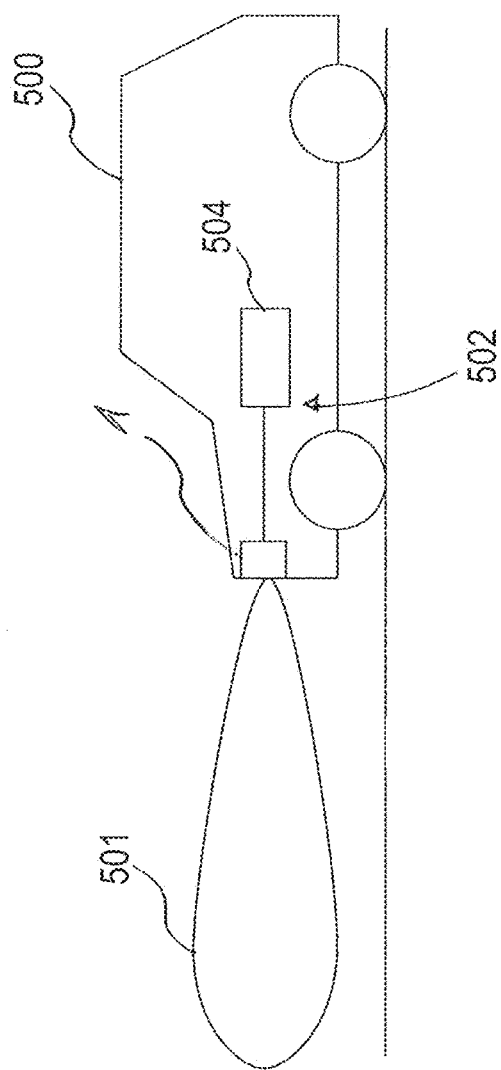
FIG. 9 illustrates an example vehicle that is equipped with a radar device according to the present disclosure.

FIG. 9 depicts an example automotive vehicle 500 that is equipped with a radar device 1 according to the present disclosure. In the embodiment shown in FIG. 9, the radar device 1 is configured as a front radar of the vehicle 1 and a radiation field 501 of an antenna device of the radar device 1 is directed in the forward direction of the vehicle 500. The radar device 1 is part of a vehicle control system 502 of the vehicle 500 and is connected to a control device 504 of the vehicle control system 502. The control device 504 is configured to perform advanced driver's assist functions, such as adaptive cruise control, emergency brake assist, lane change assist or autonomous driving, based on data signals received from the radar device 1. These data signals represent the positions of target objects in front of the radar device 1 mounted to the vehicle 500. The control device 504 is configured to at least partly control the motion of the vehicle 500 based on the data signals received from the radar device 1. For controlling the motion of the vehicle 500, the control device 504 may be configured to brake and/or accelerate and/or steer the vehicle 500.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

REFERENCE NUMERAL LIST 1 radar device
3 target object
6 target angle
7 unique target angle
10 first radar signal
15 second radar signal
18 third radar signal
19 fourth radar signal
70 propagation channel
71 first propagation channels
72 second propagation channels
81 first differential phase shift
82 differential phase shifts of radar signals travelling via first propagation channels
83 second differential phase shift
84 differential phase shifts of radar signals travelling via second propagation channels
92 first multitude
93 second multitude
100 radar circuit
105 signal generator
110 signal receiver
120 signal processing device
121 control signal
123 radar data signal
125 transmit chain
127 receive chain
130 transmit signal port
131 common signal port
135 receive signal port
200 antenna device
208 normal
210 first set
213 antenna elements
220 second set
230 signal routing device
251 first transmit antenna
252 second transmit antenna
253 third transmit antenna
254 fourth transmit antenna
255 further transmit antennas
261 first receive antenna
262 second receive antenna
263 third receive antenna
264 fourth receive antenna
265 first spacing
266 second spacing
267 third spacing
268 fourth spacing
269 fifth receive antenna
270 sixth receive antenna
271 further receive antennas
275 half the wavelength
276 path length difference
400 method
402 radiating a target object with radar signals
403 receiving reflections of radar signals
404 determining a first differential phase shift
406 determining a second differential phase shift
408 determining an angular position of a target object
500 vehicle
501 radiation field
502 vehicle control system
504 vehicle control device
600 virtual antenna array
601 first virtual antenna
602 second virtual antenna
603 third virtual antenna
604 fourth virtual antenna
605 fifth virtual antenna
606 sixth virtual antenna
607 seventh virtual antenna
608 eighth virtual antenna

What is claimed is:

1. A device comprising:
an antenna device comprising a first set of antennas configured to establish first propagation channels, a second set of antennas configured to establish second propagation channels, and a third set of antennas configured to establish third propagation channels; and
a signal processing device configured to determine a first differential phase shift among first radar signals propagating via the first propagation channels and to determine a second differential phase shift among second radar signals propagating via the second propagation channels,
antennas of the first set of antennas located at positions configured to generate the first differential phase shift for a first multitude of target angles, and antennas of the second set of antennas located at positions configured to generate the second differential phase shift for a second multitude of target angles, the signal processing device configured to evaluate third radar signals propagating via the third propagation channels established by the third set of antennas and to determine a third multitude of target angles from the third radar signals, and the signal processing device configured to determine an angular position of a target object as a unique target angle by selecting an angle that is common between the first multitude of target angles, the second multitude of target angles, and the third multitude of target angles.

2. The device according to claim 1,
wherein the first multitude of target angles comprises a first number of target angles and the second multitude of target angles comprises a second number of target angles, and
wherein a greatest common divisor of the first number of target angles and the second number of target angles equals one.

3. The device according to claim 1,
wherein respective spacings between pairs of antennas configured to establish individual first propagation channels differ by a first differential antenna spacing, and respective spacings between pairs of antennas configured to establish individual second propagation channels differ by a second differential antenna spacing, and
wherein the first differential antenna spacing is different from the second differential antenna spacing.

4. The device according to claim 3,
wherein the first differential antenna spacing is a first integer multiple of a fraction of a wavelength of the first radar signals, and the second differential antenna spacing is a second integer multiple of the same fraction of a wavelength of the second radar signals,
wherein the first integer multiple differs from the second integer multiple, and
wherein a greatest common divisor of the first integer multiple and the second integer multiple equals one.

5. The device according to claim 1,
wherein all receive antennas of the first set of antennas have a mutual spacing that is larger than half a wavelength of the first radar signals, and
wherein all receive antennas of the second set of antennas have a mutual spacing that is larger than half a wavelength of the second radar signals.

6. The device according to claim 1,
wherein all transmit antennas of the first set of antennas have a mutual spacing that is larger than half of a wavelength of the first radar signals, and
wherein all transmit antennas of the second set of antennas have a mutual spacing that is larger than half a wavelength of the second radar signals.

7. The device according to claim 1, wherein at least one of:
the third propagation channels comprise the first and second propagation channels, or
the signal processing device is configured to determine the third multitude of target angles by constructing a common virtual antenna array from the third propagation channels.

8. The device according to claim 1,
wherein the signal processing device is configured to establish a virtual antenna array from the first radar signals, and
wherein mutual spacings of individual virtual antennas of the virtual antenna array are larger than half a wavelength of the first radar signals.

9. The device according to claim 8,
wherein the signal processing device is configured to establish a further virtual antenna array from the second radar signals, and
wherein mutual spacings of individual virtual antennas of the further virtual antenna array are larger than half a wavelength of the second radar signals.

10. The device according to claim 1,
wherein the first radar signals occupy a first frequency band, and the second radar signals occupy a second frequency band that is at least partly different from the first frequency band.

11. The device according to claim 1,
wherein the device further comprises a radar circuit configured to at least one of generate or evaluate the first and second radar signals,
wherein the radar circuit is coupled to the antenna device via a multitude of ports of the radar circuit, and
wherein at least one port of the multitude of ports is configured as a common signal port that routes one of the first radar signals and one of the second radar signals between the radar circuit and the antenna device.

12. The device according to claim 11,
wherein the radar circuit configured to at least one of generate or evaluate the first and second radar signals comprises a single integrated circuit.

13. A vehicle comprising:
a radar device configured to detect a target object via a multitude of propagation channels, the radar device comprising:
   an antenna device comprising a first set of antennas configured to establish first propagation channels, a second set of antennas configured to establish second propagation channels, and a third set of antennas configured to establish third propagation channels; and
   a signal processing device configured to determine a first differential phase shift among first radar signals propagating via the first propagation channels and to determine a second differential phase shift among second radar signals propagating via the second propagation channels,
antennas of the first set of antennas located at positions configured to generate the first differential phase shift for a first multitude of target angles, and antennas of the second set of antennas located at positions configured to generate the second differential phase shift for a second multitude of target angles,
the signal processing device configured to evaluate third radar signals propagating via the third propagation channels established by the third set of antennas and to determine a third multitude of target angles from the third radar signals, and
the signal processing device configured to determine an angular position of the target object as a unique target angle by selecting an angle that is common between the first multitude of target angles, the second multitude of target angles, and the third multitude of target angles.

14. A method comprising:
irradiating a target object with radar signals;
receiving reflections of the radar signals by the target object via a multitude of propagation channels;
determining a first differential phase shift among first radar signals propagating via first propagation channels that are established by a first set of antennas, antennas of the first set of antennas located at positions that generate the first differential phase shift for a first multitude of target angles;

determining a second differential phase shift among second radar signals propagating via second propagation channels that are established by a second set of antennas, antennas of the second set of antennas located at positions that generate the second differential phase shift for a second multitude of target angles;

evaluating third radar signals propagating via third propagation channels that are established by a third set of antennas and determining a third multitude of target angles form the third radar signal; and determining an angular position of the target object as a unique target angle by selecting an angle that is common between the first multitude of target angles, the second multitude of target angles, and the third multitude of target angles.

* * * * *